Nov. 2, 1954  R. S. FOX  2,693,037
HEAD FOR PNEUMATIC GAUGES
Filed Sept. 4, 1952
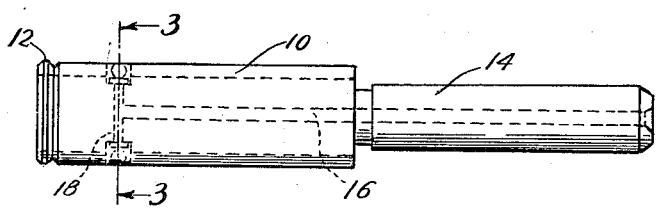
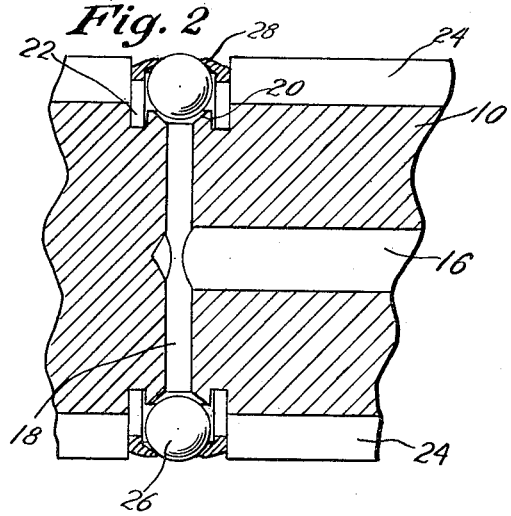
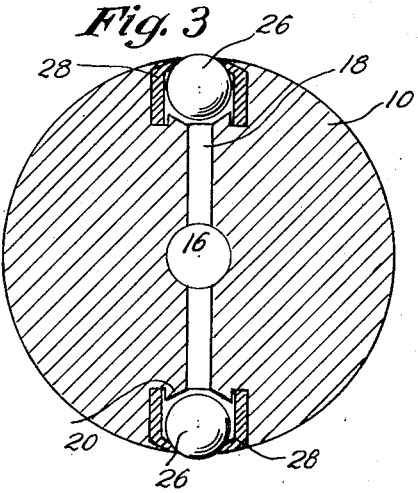
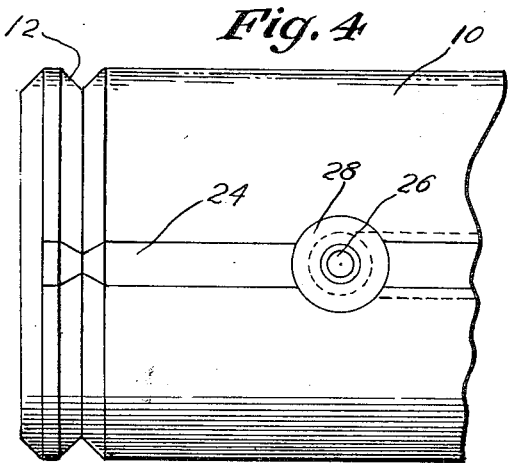
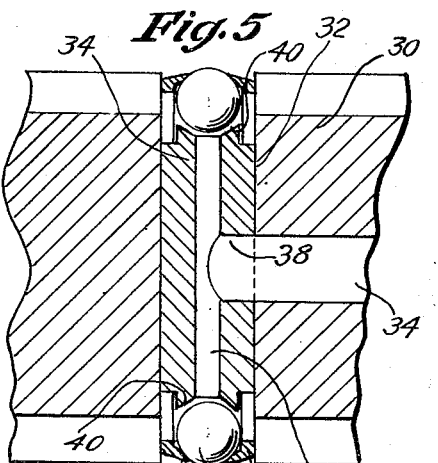
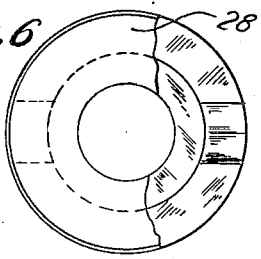
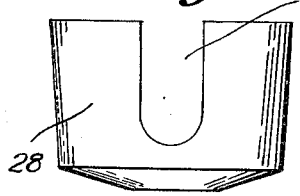
INVENTOR
R. S. FOX
BY
Joseph N. Schofield
ATTORNEY United States Patent Office 2,693,037
Patented Nov. 2, 1954

2,693,037

HEAD FOR PNEUMATIC GAUGES

Raymond S. Fox, West Hartford, Conn., assignor to Niles-Bement-Pond Company, West Hartford, Conn., a corporation of New Jersey Application September 4, 1952, Serial No. 307,836

2 Claims. (Cl. 33—178)

This invention relates to dimension gages and more particularly to the gaging head for a pneumatic gage.

A primary object of the invention is to provide a gaging head for an internal air gage which will allow spherical members housed therein to engage the work piece being gaged, the spherical members being movable inwardly within the gaging head to partially close orifices of air conduits for supplying air to the head at a constant pressure.

Another object of the invention is to provide a gaging head for this type of gage which will be simple and which will have long wearing qualities for the reason that, while the spherical members are in engagement with the work piece being gaged, they will be free to rotate out of contact with any physical parts of the gaging head by the force of the air pressure supplied to the head.

Another object of importance of the invention is to provide conical seats for the orifices of the conduits radially inward of the cylindrical surface of the gaging head and adjacent this seat is housed a ball retained in operative position closely adjacent the conical orifice but permitted by its retainer to have a portion of its surface extend beyond the surface of the head and engage the surface of the work piece being gaged.

And finally it is an object of the invention to provide a suitable retaining member inserted into the ball receiving pockets in the head from the outer surface and loosely housing the ball for limited radial movement toward and from the conical seat.

With the above and other objects in view, the invention may include the features of construction and operation set forth in the following specification and illustrated in the accompanying drawing.

In the accompanying drawing annexed hereto and forming a part of this specification, I have shown the invention embodied in an internal gaging head for an air gage, but it will be understood that the invention can be otherwise embodied, and that the drawing is not to be construed as defining or limiting the scope of the invention, the claims appended to this specification being relied upon for that purpose.

In the drawing:

Figure 1 is an outside view of a gaging head made in accordance with the present invention.

Fig. 2 is a fragmentary longitudinal sectional view on an enlarged scale showing a portion of the head shown in Fig. 1.

Fig. 3 is a cross-sectional view on an enlarged scale taken on the plane of line 3—3 in Fig. 1.

Fig. 4 is a longitudinal outside view of the head shown in Figs. 1, 2 and 3, the view being taken at right angles to Figs. 1, 2 and 3.

Fig. 5 is a longitudinal sectional view of a portion of a head showing a modified form of the invention, and Figs. 6 and 7 are separate detailed views of a retainer for the spherical members shown in Figs. 2, 3 and 5.

In the above mentioned drawing there have been shown but two embodiments of the invention which are now deemed preferable, but it is to be understood that changes and modifications may be made within the scope of the appended claims without departing from the spirit of the invention.

Briefly and in its broadest aspect the invention may include the following principal parts: First, a member, usually of cylindrical form, adapted to fit within the minimum internal dimension of the work piece to be gaged; second, air supplying conduits within the head having their orifices within counterbored portions in the outer surface of the head; third, spherical members mounted for limited radial movement adjacent the orifices of the supply conduits for the air; and fourth, individual retainers for the spherical members each partially surrounding its member and preferably pressed firmly into counterbored openings in the gaging head adjacent the air orifices.

Referring more in detail to the figures of the drawing, and first to Fig. 1, it will be seen that the embodiment of the invention selected for illustration comprises a cylindrical member 10 having pilot entering means 12 at its outer end and at its opposite end having a shank 14 for attachment to an air gage of the type shown in the patent to Moore 2,360,705, granted October 17, 1944.

Extending longitudinally within the gaging head 10 is a central conduit 16 for the supply of air or fluid under constant pressure. This central conduit 16 has its inner end intersecting radial conduits 18 extending to the periphery of the gaging head. The opposite end of the central conduit extends to the end face of the head attached to the base of an air gage as shown in the above mentioned patent.

Referring to Figs. 2 and 3, it will be seen that the radial conduits 18 intersect the central supply conduit 16 in opposed relation to each other and terminate well within the outer surface of the head 10 at diametrically opposite positions. The outer ends of these radial conduits 18 are of conical form to form seats 20 which are surrounded by a large counterbored recess 22 intersecting some air escape channels 24 extending longitudinally the full length of the gaging head.

Adjacent the conical seats 20 are positioned spherical members 26 housed within the recesses 22 and retained loosely therein by a retainer 28. It will be seen by an inspection of the drawing that the spherical members 26 are free to move limited distances toward and from the conical seats 20 and in their outward positions extend beyond the cylindrical surface of the head 10.

To mount the spherical members 26 for limited radial movement the retainers 28 of generally cup shape are provided with a central opening in their end surfaces large enough to permit a portion of the spherical member to extend therethrough. The side walls of the retainers 28 are split or slotted as shown at 30' in Fig. 7 so that their wall may be resiliently compressed to enter the recesses 22 and be firmly and frictionally secured therein. In their innermost radial positions the spherical members 26 are spaced slightly from their seats 20. And in all positions of the spherical members 26 when the gage is in operation the spherical members 26 are forced radially outward by the force of the air stream from the radial conduits 36 or 18.

In the modified form of the invention shown in Fig. 5 of the drawing the head 30 is provided with a transverse diametral opening 32 intercepting the central fluid conduit 34 and into this opening 32 is pressed a sleeve 34. The sleeve 34 has a central opening 36 extending therethrough and a lateral opening 38 intercepting the central opening through the gaging head so that air or fluid under pressure may be supplied to seats 40 at the ends of the central opening 36.

These conical end surfaces or seats 40 against which the spherical members 42 operate are in all respects similar to those shown in Figs. 2 and 3. The length of the sleeve 34 is chosen with respect to the dimensions to be gaged so the spherical members 42 may vary their radial positions toward and from the conical seat surfaces 40 within the range of dimensions being gaged.

To retain the spherical members 42 in their positions, retaining members 44 similar to those described above may be employed. These members 44 as shown are cup-shaped and are pressed directly into the transverse opening 32 through the gaging head 30. Movement outward of the spherical members 42 is such that a small portion of their surface extends beyond the surface of the gaging head as in the embodiment shown in Figs. 1, 2 and 3. When forced radially inward by engagement with the piece being gaged, the spherical members 42 still are slightly spaced from their conical seats 40.

In operation and with the gage head attached to the gage base as shown in the above referred to patent, the work piece is placed over the head with the surface being gaged contacting the spherical members 26 or 42. Contact of these members with the surface being gaged forces the members radially inward to an intermediate position toward their conical seats. This movement of the members partially blocks the orifices of radial conduits 18 or 36 and builds up pressure within these conduits and the central conduits 16 or 34. Measurements of the pressures within these conduits with different work pieces in position over the gage head will be made in the same manner as in the above mentioned patent and will indicate variations in the dimension being gaged in the same manner.

I claim as my invention:

1. In a dimension gage, a gage head having fluid conduits therein extending to the work engaging surface thereof, said conduits having orifices within counterbored recesses in the surface of the gage head and positioned below said work engaging surface of said head, conical seats formed at the orifices of said fluid conduits within the gaging head, air escape channels intersecting said fluid conduits, spherical members within said counterbores, and cup-shaped retaining means for said spherical members pressed within the recesses in the gaging head and permitting limited free movement of said spherical members toward and from said seats, said retaining means having a central opening in its end surface and slotted resilient side walls.

2. A gauging head of the character described adapted for use with an air gauge or the like, comprising: a generally cylindrical body having a fluid supply path therein and a diametral bore in communication with said fluid supply path; said body having counterbores at the bore outlets providing ball-receiving pockets the walls of which are surfaces of the body, which pockets have annular shoulders at the inner ends thereof; a ball rotatable in each of the pockets in concentric relationship to the walls thereof; each annular shoulder cooperating directly with the inner side of the respective ball to control flow from the bore toward the ball; air escape channels in the outer surface of said body communicating with the pockets; and a removable retaining means in each of the pockets engageable by outward portions of the respective ball for removably retaining the ball in the pocket and limiting the travel of the ball away from the annular shoulder to the extent that the outer portion of each ball may project slightly beyond the adjacent portions of the body for contact with the work to be gauged.

References Cited in the file of this patent

UNITED STATES PATENTS

| Number | Name | Date |
|--------|------|------|
| 2,306,469 | Rupley | Dec. 29, 1942 |
| 2,360,705 | Moore | Oct. 17, 1944 |
| 2,501,130 | Kuppersmith | Mar. 21, 1950 |